A. T. LIGHT.
FREEZER.
APPLICATION FILED MAY 28, 1919.
1,435,246.
Patented Nov. 14, 1922.
3 SHEETS—SHEET 1.
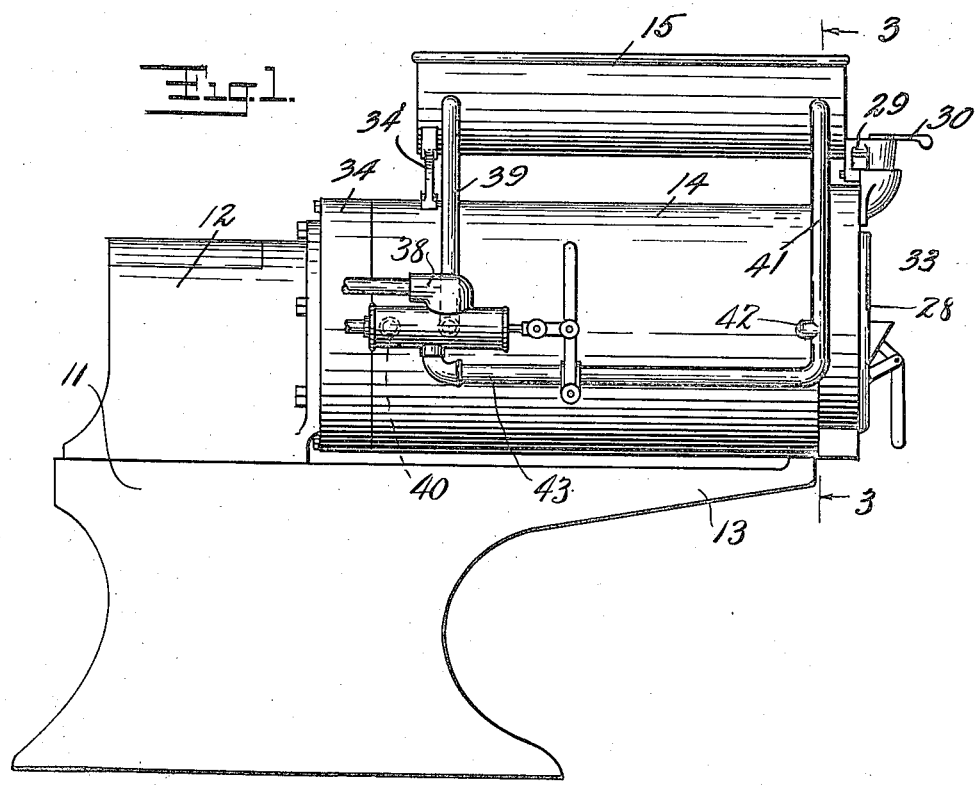
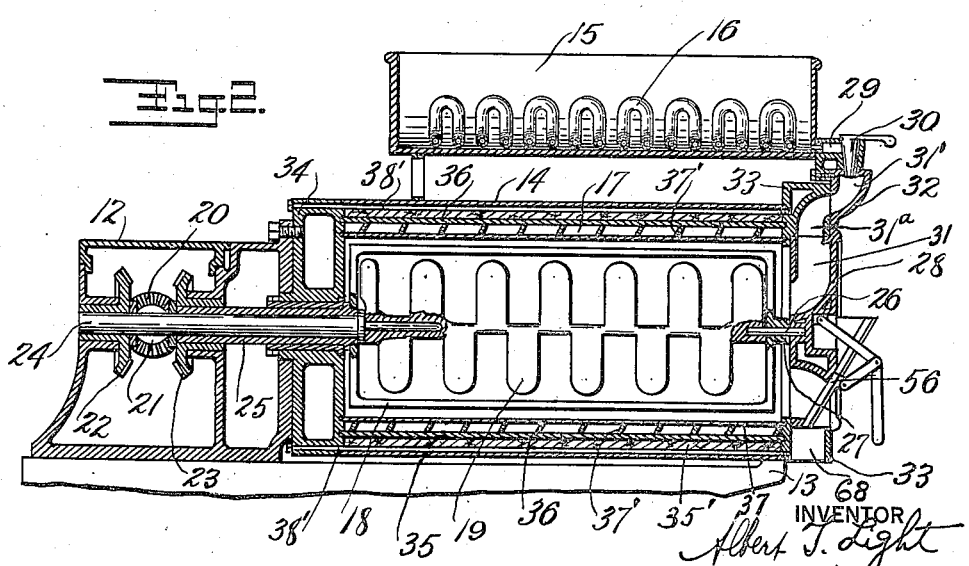

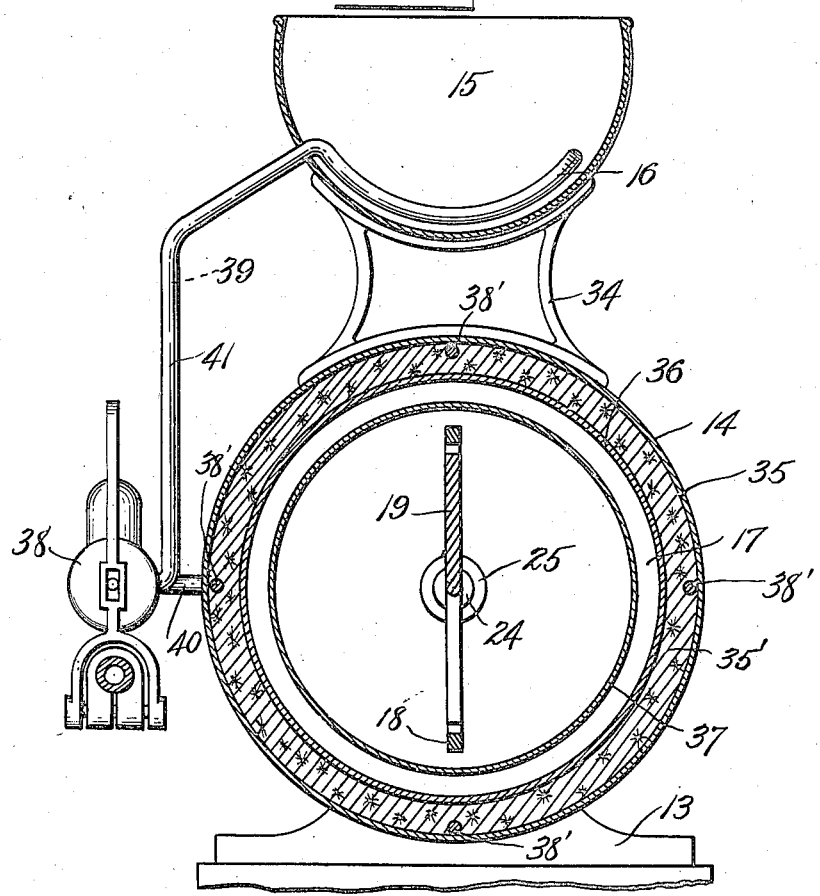
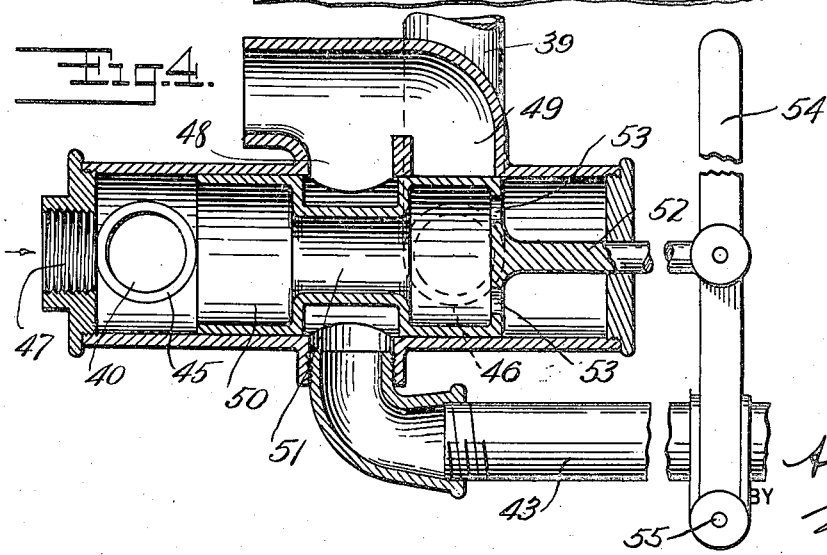

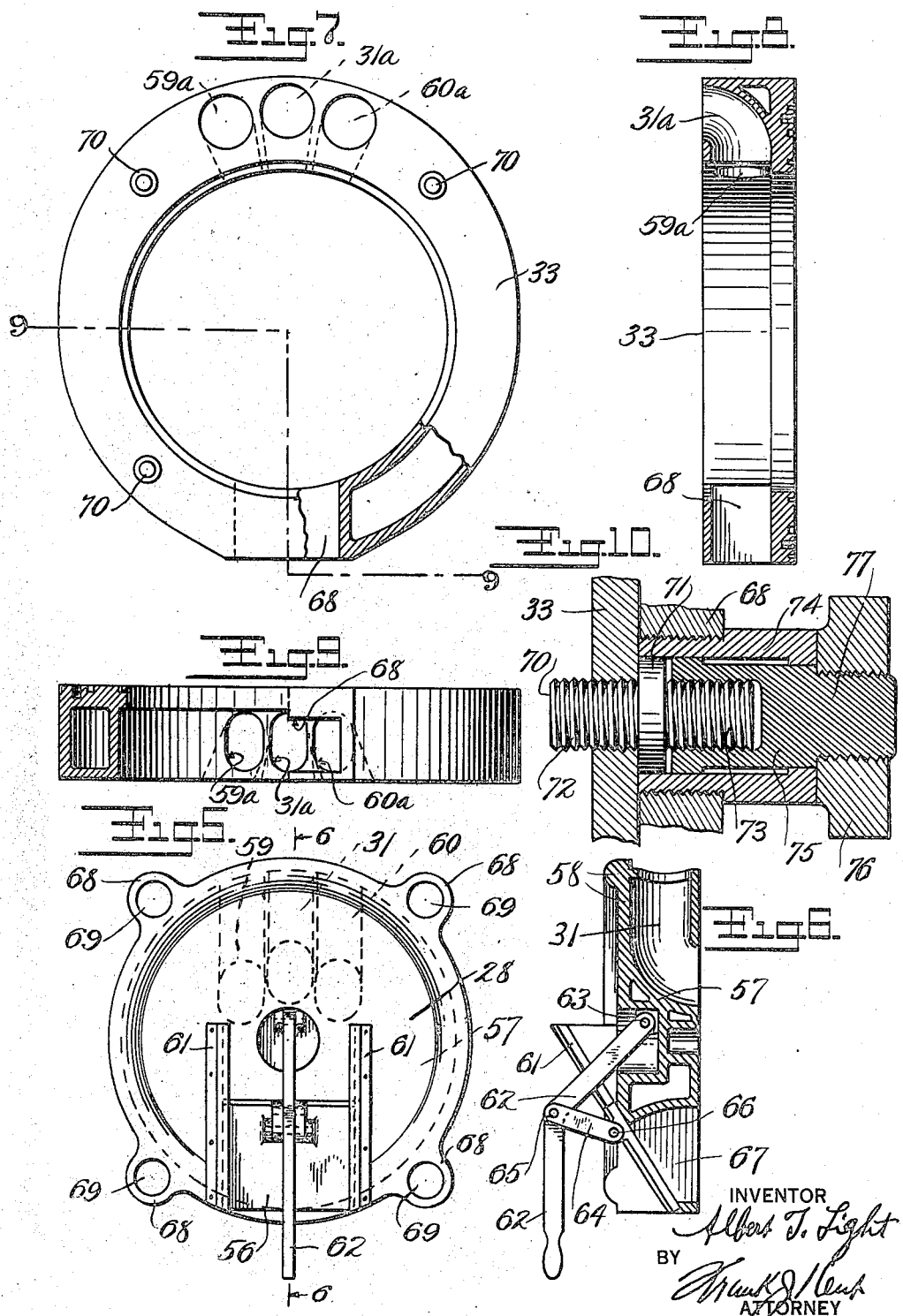

Patented Nov. 14, 1922.

1,435,246

UNITED STATES PATENT OFFICE.

ALBERT T. LIGHT, OF NEW YORK, N. Y.

FREEZER.

Application filed May 28, 1919. Serial No. 300,293.

*To all whom it may concern:*

Be it known that I, ALBERT T. LIGHT, a subject of the King of Great Britain and Ireland, residing at New York, in the county of Bronx and State of New York, have invented certain new and useful Improvements in Freezers, of which the following is a specification.

This invention relates to improvements in the art of freezing edible mixtures, and more particularly aims to provide a novel method of and apparatus for freezing icecream and the like rapidly, conveniently and economically.

An object of the invention is to provide a single valve having a single valve-member, for applying a non-circulating freezing medium relative to one container, hereinafter called the cream-can, for applying a circulating freezing medium relative to another container, hereinafter called the dasher-box or cylinder, and for applying a non-circulating freezing medium relative to the latter container.

Other objects of the invention pertain to the provision of structural details whereby the apparatus gives increased production, is operated inexpensively, and is of simple, reliable, cheap and rugged construction.

The invention will be more clearly understood from the following description, when taken in connection with the accompanying drawings, illustrating an embodiment of the invention at present preferred.

In these drawings, Figure 1 is a side elevation of said embodiment; Figure 2 is a vertical section taken axially of the dasher cylinder; Figure 3 is a transverse section on an enlarged scale, taken approximately on the line 3—3 of Figure 1; Figure 4 is a vertical axial section, on an enlarged scale, taken through the valve; Figure 5 is an outside end elevation, on an enlarged scale, of a removable end plate for the dasher cylinder, being the end plate for the right-hand end of the dasher cylinder as viewed in Figure 1; Figure 6 is a sectional view through said end plate, being a section on the line 6—6 of Figure 5, with certain parts shown in elevation; Figure 7 is a view similar to Figure 5, showing the ring member on and in which the removable end plate of Figure 5 may be mounted; Figure 8 is a vertical diametral sectional view taken through the ring member of Figure 7; Figure 9 is an end elevation of the ring member shown in Figure 7 looking upward in Figure 7, being partially a sectional view as indicated by the line 9—9 of Figure 7; and Figure 10 is an axial sectional view, on a very much enlarged scale, taken through a mounting means for facilitating handling of the end plate of Figures 5 and 6 relative to the ring member of Figures 7, 8 and 9.

The apparatus will be clearly understood from the following structural description.

Referring to Figures 1, 2, and 3, the apparatus has a base 11 including a housing 12 and a shelf 13; a dasher box or cylinder 14; an open pan or cream-can 15; a coil 16 in the cream-can; a jacket 17 in the dasher-box; a pair of oppositely rotating dashers 18 and 19 in the cylinder 14; and a familiar bevel gear and sleeve-on-shaft arrangement for simultaneously rotating the dashers from a bevel gear 20 on a shaft 21.

As shown best in Figure 2, these rotating means are in the main in housing 12, the gear 20 meshing with bevel gears 22 and 23; gear 22 being fast on a shaft 24 having fixed thereon dasher 19, and gear 23 being fast on a sleeve 25, this sleeve being loose on shaft 24 and having fixed thereon dasher 18. Dasher 18 fixedly carries a pin 26 loose in a sleeve 27 and journalled in a suitable socket formed in a removable end plate 28.

Cream-can 15 carries an L-shaped spout-part 29, adapted, when a valve member 30 is removed, to communicate with a passage 31' in a fixture 32 secured between a ring member 33 and spout-part 29. This arrangement permits the mixture, after being confined and precooled in cream-can 15, to be transferred to the cylinder 14 and within the jacket 17.

The cylinder structure is as follows: An end plate 34, through the center of which sleeve 25 is passed for journalling, is permanently bolted to housing 12. This end plate has a plurality of annular grooves as indicated, for receiving three substantially concentric shells 35, 36 and 37. The opposite edge of these shells are set in said grooves and in similar grooves in the ring member 33; four (see Figure 3) tie bolts 38' being threaded into the end ring as shown to the right of Figure 2, to clamp the parts securely together.

It will be noted that the parts 12 and 13 of the base provide an L, the outer end of the horizontal stroke of which (the shelf 13) only supports the cylinder; thus avoiding a serious previous trouble following the necessity of accurately machining the whole shelf, and particularly the part thereof near the housing, to fit the cylinder.

The fixture 32 and a bracket 34', combine to mount the cream-can on the cylinder and establish the feed passage 31ᵃ relative to the spout part 29 and the cylinder interior.

Between the shells 35 and 36 is a heat-insulating blanket 35' of suitable material.

Between the shells 36 and 37 is formed the jacket 17.

In such jacket there is arranged a removable spiral member 37' to provide a spiral conduit for the passage of liquid through the jacket by a path considerably longer than the length of the cylinder. On corrosion, the member 37' may be readily removed and a substitute inserted.

From a valve 38 an inlet conduit 39 leads to one end of the coil 16 in the cream-can, and an inlet conduit 40 leads to the jacket 17, and from the coil and jacket respectively lead return conduits 41 and 42, both the latter leading to a common return conduit 43 leading back to the valve.

Next referring to the valve, see Figure 4: The valve casing has a port 45 leading to the conduit 40, a port 46 leading to the conduit 39, a return port opened into by the conduit 43, an intake port 47 and outlet ports 48 and 49. The valve includes also a hollow valve member 50 having a reduced central portion 51, a stem 52 projecting beyond the casing and ports 53 in the closed end wall of the valve member; the valve member being operable by a hand lever 54 pivoted at 55.

During the making of ice-cream the process may be carried out, by using said valve, as follows: First, the valve member 50 is moved to its extreme left position. The freezing medium then flows from the port 47, through the hollow valve member and its ports 53, into the valve casing and through the port 46 into the conduit 39. This fills the coil 16 in the cream-can with a non-circulating medium; the valve member cutting off communication between return conduit 43 and port 48 or 49. The surplus medium flowing thereafter into the valve through inlet 47 passes off through port 49. (Port 45, it is noted, is cut off, and no medium is yet going to the cylinder).

Next, the valve member is moved to its intermediate (illustrated) position. The freezing medium then flows, through port 45 and conduit 40, into jacket 17 of the cylinder, and circulates continuously therethrough; conduits 42 and 43 being open to port 48 by way of the space surrounding the reduced port 51 of the valve member. The medium in the coil 17 is, at the same time, trapped therein.

Next, the valve member is moved to the extreme right position. Communication between the conduit 43 and port 48 or 49 being interrupted, the medium is now trapped in both the coil 16 and in the cylinder.

When the ice-cream mixture, after having been thus pre-cooled in the cream-can, and further cooled and agitated in the cylinder, is finally frozen, a discharge gate 56 is opened at one end of the cylinder.

This gate 56 and its operating parts and the removable end plate 28 carrying the same, and the ring member 33, are shown best in Figures 5 to 9, to which reference may now be had.

Referring to Figures 5 and 6, the end plate 28 includes a main part 57 carrying a flange 58. On opposite sides of a passage 31 (below the valve 30 of Figure 2) are passages 59 and 60 for registering respectively with passages 59ᵃ and 60ᵃ in the ring member 33 of Figure 7 when the parts 28 and 33 are fixed in place as shown in Figure 2—at which time the passage 31 of part 28 registers with a passage 31ᵃ of part 33, between passages 59ᵃ and 60ᵃ. The passages 59—59ᵃ and 60—60ᵃ permit flavoring and the like to be added to the ice-cream mixture in the cylinder. Valves similar to the valve 30 (Figure 2) may be provided for the passages 59ᵃ and 60ᵃ.

Referring again to Figures 5 and 6, the valve 56 slides in ways 61 inclined as shown, and is operated by a lever 62 pivoted to end plate 28 at 63 and to a link 64 at 65, the link being pivoted to the valve at 66. End plate 28 is mounted in place on and in ring member 33 (as shown in Figure 2), and to permit functioning then of the valve 56, the end plate has formed therein a passage 67 registering with a passage 68 formed in the ring member.

To permit ready mounting and demounting of the end plate 28 relative to the ring member 33, the folowing parts are provided. The end plate has four ears 68, each having a tapped aperture 69. The ring member has four projections 70 (Figure 7) adapted to be placed in axial registration with the apertures 69 of the end plate.

The mounting means, including said projections 70 and ears 68, for permitting the heavy end plate to be mounted in place without supporting the weight of the same while fitting threaded parts to co-acting threaded parts, is shown, as to one of its four sets, in Figure 10. This includes the following parts, in addition to a projection 70 formed integrally of a smooth cylindrical base 71, of a screw-part 72 threaded into the member 33, and of a screw part 73 beyond the base, to wit, a sleeve 74 to be first threaded into an ear 68 as shown, a hollow member 75 to be next slid to the right in sleeve 74 as shown, to permit the sleeve next to be slid to the left over base 71 while said sleeve carries an ear 68 of the end plate 28, and to permit the member 75 to be thereupon spirally turned in the sleeve to thread said member on the screw part 73 on end ring 33, and a readily removable and attachable knurled thumb-piece 76 threaded on the projecting threaded part 77 of member 75 before the parts 75 and 73 are co-acted as just described, to permit such co-action.

Among the important features of the apparatus described are the cream cooler or pre-cooler attached to the freezer, for lowering the temperature of cream before admitting it into cylinder. This will reduce the freezing time, also prevent buttering while being whipped, and increase the swell, if desired, because a much higher speed can be used as the whole of the whipping will be done during the period in which the air cells are formed and held up in the cream by means of agitation and freezing.

Also, the head ring for the front end of the machine is designed with three L-shaped passages. The centre passage is for conveying the cream from the cream can or reservoir into the cylinder or freezing chamber. The left passage is for fruit or syrup which may be poured in at any time during the freezing of the batch. The shape and design of the tubular passage is such that the cream or fruit will not splash out. The right hand passage is for permitting the air to escape while the cream is going into the cylinder. This will prevent the boiling out effect, due to the escape of air through the cream while filling.

Also, the cover has three conducting passages cast therein, which correspond with the three passages in the head. The shape of these passages is like a pipe L and when in position with the head ring, form an S-shape tubular passage, so that the whipping and scraping device will not throw back the cream during filling, while observing through the air outlet, which also is used for observation to tell when the cream is frozen.

And the method of attaching the rear end of the cylinder to the gear box does away with the foot on the rear end, and makes it easier to bring the cylinder into alignment with the gear box. It also makes it possible to remove a cylinder and replace it at any time without risk of the centre shaft or main bushing jamming through inaccuracy of alignment.

I claim:—

1. In an ice-cream freezer, the combination of a cream-can having a freezing-medium chamber, a dasher box having a freezing-medium chamber, there being associated with the cream-can and dasher box a valve structure for a freezing medium, conduits leading from said structure to said chambers and from said chambers back to the structure, said structure including a single valve member movable to permit the passage of the freezing medium to the cream-can chamber alone or to both chambers concurrently.

2. In an ice-cream freezer, the combination of a cream-can having a freezing-medium chamber, a dasher box having a freezing-medium chamber, there being associated with the cream-can and dasher box a valve structure for a freezing medium, conduits leading from said structure to said chambers and from said chambers back to the structure, said structure including a single valve member and two outlet ports and one inlet port in communication with said conduits and a single valve member movable to one position to permit the passage of the medium into the cream-can chamber, movable to a second position to strap the medium in said chamber and to circulate the medium through the dasher-box chamber, and movable to a third position to trap the medium in both chambers.

3. In an ice cream freezer, the combination of a cream-can having a freezing-medium chamber, a dasher box having a freezing medium chamber, a valve casing interposed between said chambers and having a conduit leading to each respective chamber and return conduits from said chambers back to the casing, and a valve member within the casing for optionally controlling the passage of a freezing medium to one or both of said chambers.

4. In an ice cream freezer, the combination of a cream-can having a freezing-medium chamber, a dasher box having a freezing medium chamber, a valve casing interposed between said chambers and having supply and return conduits leading to and from the respective chambers, and means within the casing for optionally applying a non-circulating freezing medium to the cream-can freezing chamber and a circulating freezing medium to the dasher box freezing chamber.

5. In a freezer of the class described comprising a horizontally arranged dasher-box having a removable end plate with a discharge port therein, a slide valve controlling the passage through the discharge port, said slide valve being inclined downwardly toward the interior of the dasher-box and manual operated means for controlling the operations of the slide valve consisting of link and lever members interpivoted and including two floating pivots.

In testimony whereof I affix my signature.

ALBERT T. LIGHT.